US012794640B2

(12) United States Patent
Tidestav

(10) Patent No.: US 12,794,640 B2
(45) Date of Patent: Nov. 10, 2026

(54) SYSTEMS AND METHODS FOR TCI STATE SIGNALING FOR CARRIER AGGREGATION

(71) Applicant: Telefonaktiebolaget LM Ericsson (publ), Stockholm (SE)

(72) Inventor: Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 18/560,729

(22) PCT Filed: May 20, 2022

(86) PCT No.: PCT/IB2022/054760
§ 371 (c)(1),
(2) Date: Nov. 14, 2023

(87) PCT Pub. No.: WO2022/243978
PCT Pub. Date: Nov. 24, 2022

(65) Prior Publication Data

US 2024/0250796 A1 Jul. 25, 2024

Related U.S. Application Data

(60) Provisional application No. 63/191,219, filed on May 20, 2021.

(51) Int. Cl.
*H04L 5/00* (2006.01)

(52) U.S. Cl.
CPC .......... *H04L 5/0053* (2013.01); *H04L 5/0035* (2013.01); *H04L 5/0051* (2013.01); *H04L 5/0094* (2013.01)

(58) Field of Classification Search
CPC ..... H04L 5/001; H04L 5/0023; H04L 5/0044; H04L 5/0091; H04L 5/0053; H04L 5/0035; H04L 5/0094; H04L 5/0051
(Continued)

(56) References Cited

U.S. PATENT DOCUMENTS

2018/0192445 A1* 7/2018 Jiang ..................... H04W 72/21
2020/0107352 A1* 4/2020 Tsai ..................... H04B 7/0691
(Continued)

FOREIGN PATENT DOCUMENTS

WO 2022173262 A1 8/2022

OTHER PUBLICATIONS

Author Unknown, "Technical Specification Group Radio Access Network; NR; Physical layer procedures for data (Release 16)," Technical Specification 38.214, Version 16.5.0, Mar. 2021, 3GPP Organizational Partners, 171 pages.
(Continued)

*Primary Examiner* — Stephen J Clawson
(74) *Attorney, Agent, or Firm* — Withrow & Terranova, PLLC

(57) ABSTRACT

Systems and methods for Transmission Configuration Indicator (TCI) state signalling for carrier aggregation are provided. In some embodiments, a method performed by a wireless device for determining TCI states includes receiving a TCI state list in a Physical Downlink Shared Channel (PDSCH) configuration from a reference Bandwidth Part (BWP)/cell; and receiving, in a BWP/cell other than the reference BWP/cell, a PDSCH configuration comprising a pointer to the reference BWP/cell. In some embodiments, RRC overhead from TCI state configuration is reduced.

14 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0229161 | A1* | 7/2020 | Raghavan | H04L 5/0048 |
| 2021/0051650 | A1* | 2/2021 | Yi | H04W 72/21 |
| 2021/0259001 | A1* | 8/2021 | Park | H04W 72/0453 |
| 2021/0321411 | A1* | 10/2021 | Sakhnini | H04B 7/06968 |
| 2022/0116256 | A1* | 4/2022 | Shahmohammadian | H04W 4/027 |
| 2022/0201502 | A1* | 6/2022 | Kang | H04B 7/08 |
| 2023/0010532 | A1* | 1/2023 | Matsumura | H04L 5/0051 |
| 2023/0126574 | A1* | 4/2023 | Ji | H04W 72/1273 370/329 |
| 2023/0208597 | A1* | 6/2023 | Yao | H04B 7/0695 370/329 |
| 2023/0319839 | A1* | 10/2023 | Nilsson | H04L 5/0091 370/329 |

OTHER PUBLICATIONS

Author Unknown, "Technical Specification Group Radio Access Network; NR; Radio Resource Control (RRC) protocol specification (Release 16)," Technical Specification 38.331, Version 16.4.1, Mar. 2021, 3GPP Organizational Partners, 949 pages.
Mediatek Inc., "R1-2105353: Enhancement on multi-beam operation," 3GPP TSG RAN WG1 #105-e, May 10-27, 2021, Electronic Meeting, 28 pages.
Xiaomi, "R1-2105540: Enhancements on multi-beam operation," 3GPP TSG RAN WG1 #105-e, May 10-27, 2021, Electronic Meeting, 12 pages.
International Search Report and Written Opinion for International Patent Application No. PCT/IB2022/054760, mailed Aug. 3, 2022, 16 pages.
ZTE, "R1-2007770: Further details on Multi-beam and Multi-TRP operation," 3GPP TSG RAN WG1 Meeting #103-e, Oct. 26-Nov. 13, 2020, Electronic Meeting, 14 pages.
Examination Report for European Patent Application No. 22727483.4, mailed Jul. 6, 2026, 8 pages.

* cited by examiner

SYSTEMS AND METHODS FOR TCI STATE SIGNALING FOR CARRIER AGGREGATION

RELATED APPLICATIONS

This application is a 35 U.S.C. § 371 national phase filing of International Application No. PCT/IB2022/054760, filed May 20, 2022, which claims the benefit of provisional patent application Ser. No. 63/191,219, filed May 20, 2021, the disclosures of which are hereby incorporated herein by reference in their entireties.

TECHNICAL FIELD

The disclosure relates generally to determining Transmission Configuration Indicator (TCI) states.

BACKGROUND

In NR, several signals can be transmitted from different antenna ports of a same base station. These signals can have the same large-scale properties such as Doppler shift/spread, average delay spread, or average delay. These antenna ports are then said to be Quasi Co-Located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, there may be a QCL relation between a CSI-RS for Tracking RS (TRS) and the PDSCH DMRS. When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE would have to receive it with a sufficiently good SINR. In many cases, this means that the TRS must be transmitted in a suitable beam to a certain UE.

To introduce dynamics in beam and transmission point (TRP) selection, the UE can be configured through RRC signaling with up to 128 Transmission Configuration Indicator (TCI) states. The TCI state information element is shown below. TCI State information element (Extracted from 3GPP TS 38.331):

```
TCI-State : :=               SEQUENCE {
   tci-StateId                  TCI-StateId,
   qcl-Type1                    QCL-Info,
   qcl-Type2                    QCL-Info
   . . .
}
QCL-Info : :=                SEQUENCE {
   cell                         ServCellIndex
   bwp-Id                       BWP-Id
   referenceSignal              CHOICE {
      csi-rs                       NZP-CSI-RS-
ResourceId,
      ssb                          SSB-Index
   },
   qcl-Type                     ENUMERATED {typeA, typeB,
typeC, typeD},
   . . .
}
```

Each TCI state contains QCL information related to one or two RSs. For example, a TCI state may contain CSI-RS1 associated with QCL Type A and CSI-RS2 associated with QCL TypeD. If a third RS, e.g., the PDCCH DMRS, has this TCI state as QCL source, it means that the UE can derive Doppler shift, Doppler spread, average delay, delay spread from CSI-RS1 and Spatial Rx parameter (i.e., the RX beam to use) from CSI-RS2 when performing the channel estimation for the PDCCH DMRS. The TCI states are configured in the PDSCH-Config, and separately for each serving cell and Bandwidth Part (BWP).

Carrier Aggregation

Both FR1 And FR2 use the concept of carrier aggregation. With carrier aggregation, the communication takes place over several carriers. One is the primary component carrier, which is used for initial access. The other carriers are secondary component carriers and are added to improve capacity. In FR2, a typical carrier bandwidth is 100 MHz and typically 8 carriers are added to form a total carrier BW of 800 MHZ. In 3GPP specification, each carrier is called a cell: the primary component carrier is called the primary cell (PCell, or PSCell), whereas the secondary component carriers are called secondary cells (SCells).

Each of the cells can be configured independently, i.e., each cell can be configured with a separate set of RRC parameters. This is true in particular for the TCI states: in each cell and BWP, there is a separate list of TCI states. Still, in many cases, the list of TCI states is identical in different carriers.

Bandwidth Parts

The UE can be configured with one or up to four bandwidth parts (BWP). One BWP may span a part of the bandwidth of the carrier. Hence, a BWP may start at a CRB larger than zero. All configured BWPs have a common reference, the CRB 0. Hence, a UE can be configured a narrow BWP (e.g., 10 MHZ) and a wide BWP (e.g., 100 MHz), but only one BWP can be active for the UE at a given point in time. The UE can be instructed to change the active BWP using DCI signaling. Improved systems and methods for TCI state signaling for carrier aggregation are needed.

SUMMARY

Systems and methods for Transmission Configuration Indicator (TCI) state signalling for carrier aggregation are provided. In some embodiments, a method performed by a wireless device for determining TCI states includes receiving a TCI state list in a Physical Downlink Shared Channel (PDSCH) configuration from a reference Bandwidth Part (BWP)/cell; and receiving, in a BWP/cell other than the reference BWP/cell, a PDSCH configuration comprising a pointer to the reference BWP/cell. In some embodiments, RRC overhead from TCI state configuration is reduced.

Certain aspects of the present disclosure and their embodiments may provide solutions to the aforementioned or other challenges. Include the TCI state list in the PDSCH configuration only in one of the cells/BWPs (the reference cell/BWP). In the PDSCH configuration in other cells/BWPs, include a pointer to the reference cell/BWP.

Signalling mechanism to convey TCI states to a UE that operates in carrier aggregation. There are, proposed herein, various embodiments which address one or more of the issues disclosed herein. In some embodiments, a method performed by a wireless device for determining Transmission Configuration Indicator, TCI, states, the method comprising one or more of: receiving a TCI state list in a Physical Downlink Shared Channel, PDSCH, configuration. In some embodiments, the TCI state list is received in the PDSCH configuration in only one of the cells/Bandwidth Parts, BWPs.

In some embodiments, the TCI state list is received in the PDSCH configuration in only a subset of the cells/Bandwidth Parts, BWPs.

In some embodiments, the method optionally includes receiving, in a cell/BWP other than the only one of the cells/BWPs, a PDSCH configuration comprising a pointer to the only one of the cells/BWPs.

In some embodiments, the only one of the cells/BWPs comprises a reference cell/BWP. In some embodiments, the only a subset of the cells/BWPs comprises a set of reference cells/BWPs.

In some embodiments, the PDSCH configuration comprises two new fields that provide the pointer to a reference cell and/or a reference BWP where the wireless device can find the TCI states.

In some embodiments, when using the two fields, no TCI states are added using the field tci-StatesToAddModList.

Certain embodiments may provide one or more of the following technical advantage(s), such as reduction of RRC overhead from TCI state configuration.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
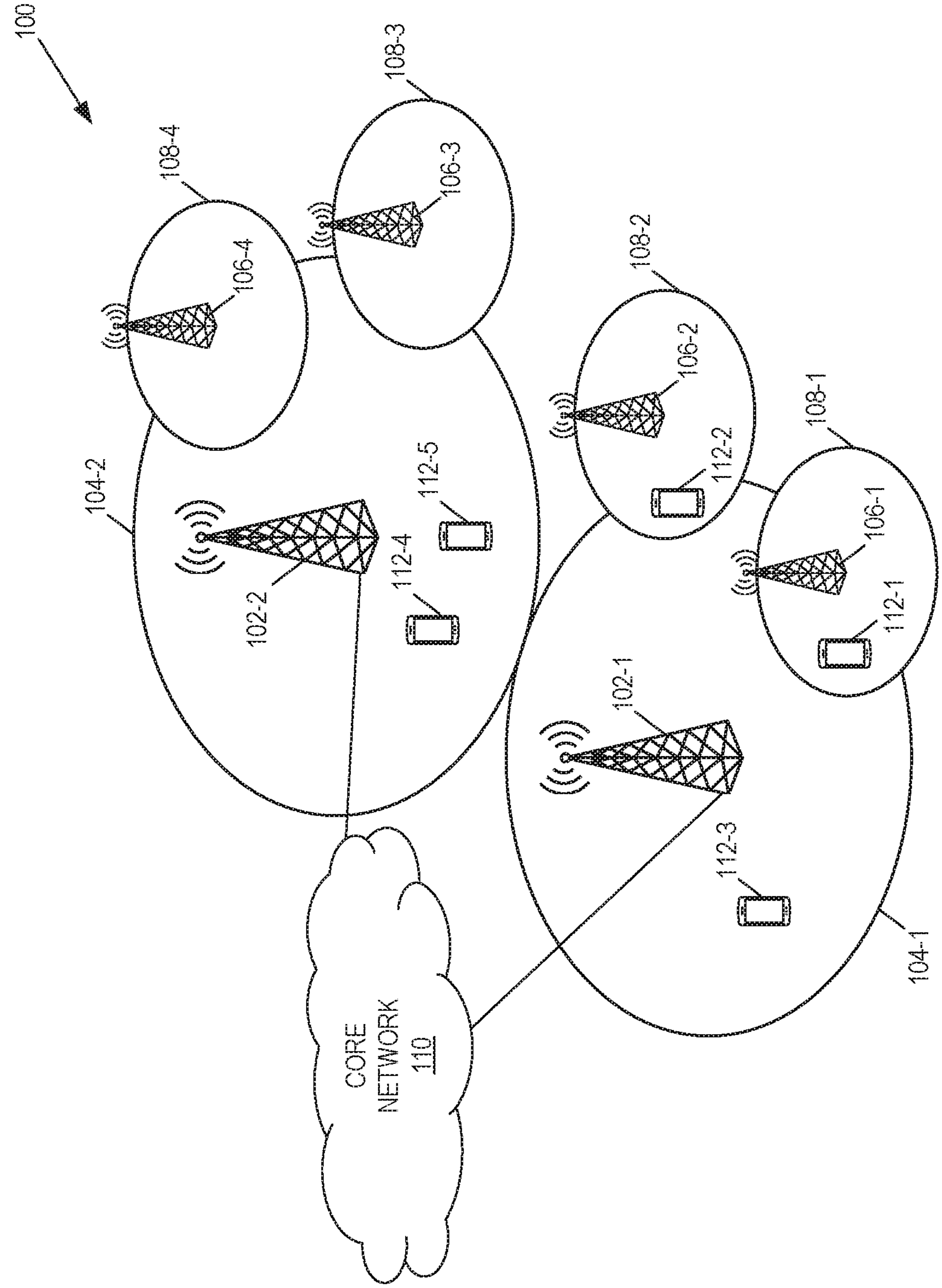
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a “radio node” is either a radio access node or a wireless communication device.

Radio Access Node: As used herein, a “radio access node” or “radio network node” or “radio access network node” is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a “core network node” is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC). In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

In current NR specification, the TCI states are configured using the RRC fields tci-StatesToAddModList and tci-StatesToReleaseList. With these RRC fields, the TCI states are added and removed to the list. The RRC information element PDSCH-Config is depicted below. The PDSCH configuration as in 38.331:

```
-- ASN1START
-- TAG-PDSCH-CONFIG-START
PDSCH-Config : :=                                  SEQUENCE {
```

-continued

```
   dataScramblingIdentityPDSCH                       INTEGER (0. .1023)
OPTIONAL,     -- Need S
   dmrs-DownlinkForPDSCH-MappingTypeA                SetupRelease { DMRS-
DownlinkConfig }                                        OPTIONAL,     --
Need M
dmrs-DownlinkForPDSCH-MappingTypeB                   SetupRelease { DMRS-
DownlinkConfig }                                        OPTIONAL,     --
Need M
   tci-StatesToAddModList                          SEQUENCE
(SIZE (1. .maxNrofTCI-States) ) OF TCI-State
OPTIONAL,     -- Need N
   tci-StatesToReleaseList                         SEQUENCE
(SIZE (1. .maxNrofTCI-States) ) OF TCI-StateId
OPTIONAL,     -- Need N
   vrb-ToPRB-Interleaver                           ENUMERATED {n2, n4}
OPTIONAL,     -- Need S
   resourceAllocation                              ENUMERATED {
resourceAllocationType0, resourceAllocationType1, dynamicSwitch},
   pdsch-TimeDomainAllocationList                  SetupRelease { PDSCH-
TimeDomainResourceAllocationList }                    OPTIONAL,     --
Need M
   pdsch-AggregationFactor                         ENUMERATED { n2, n4,
n8 }                                                  OPTIONAL,     --
Need S
   rateMatchPatternToAddModList                    SEQUENCE (SIZE
(1. .maxNrofRateMatchPatterns) ) OF RateMatchPattern           OPTIONAL,
-- Need N
   rateMatchPatternToReleaseList                   SEQUENCE (SIZE
(1. .maxNrofRateMatchPatterns) ) OF RateMatchPatternId          OPTIONAL,
-- Need N
   rateMatchPatternGroup1                          RateMatchPatternGroup
OPTIONAL,     -- Need R
   rateMatchPatternGroup2                          RateMatchPatternGroup
OPTIONAL,     -- Need R
   rbg-Size                                        ENUMERATED { config1,
config2 },
   mcs-Table                                       ENUMERATED { qam256,
qam6 4LowSE }                                           OPTIONAL,     --
Need S
   maxNrofCodeWordsScheduledByDCI                  ENUMERATED {n1, n2}
OPTIONAL,     -- Need R
   prb-BundlingType                                CHOICE {
      staticBundling                                  SEQUENCE {
         bundleSize                                      ENUMERATED {
n4, wideband }                                        OPTIONAL     --
Need S
      },
      dynamicBundling                              SEQUENCE {
         bundleSizeSet1                               ENUMERATED { n4,
wideband, n2-wideband, n4-wideband }                  OPTIONAL,     --
Need S
         bundleSizeSet2                               ENUMERATED { n4,
wideband }                                            OPTIONAL     --
Need S
      }
   },
   zp-CSI-RS-ResourceToAddModList                        SEQUENCE
(SIZE (1. .maxNrofZP-CSI-RS-Resources) ) OF ZP-CSI-RS-Resource
OPTIONAL,     -- Need N
   zp-CSI-RS-ResourceToReleaseList                       SEQUENCE
(SIZE (1. .maxNrofZP-CSI-RS-Resources) ) OF ZP-CSI-RS-ResourceId
OPTIONAL,     -- Need N
   aperiodic-ZP-CSI-RS-ResourceSetsToAddModList          SEQUENCE
(SIZE (1. .maxNrofZP-CSI-RS-ResourceSets) ) OF ZP-CSI-RS-
ResourceSet
OPTIONAL,     -- Need N
   aperiodic-ZP-CSI-RS-ResourceSetsToReleaseList      SEQUENCE (SIZE
(1. .maxNrofZP-CSI-RS-ResourceSets) ) OF ZP-CSI-RS-ResourceSetId
OPTIONAL,     -- Need N
   sp-ZP-CSI-RS-ResourceSetsToAddModList           SEQUENCE (SIZE
(1. .maxNrofZP-CSI-RS-ResourceSets) ) OF ZP-CSI-RS-ResourceSet
OPTIONAL,     -- Need N
   sp-ZP-CSI-RS-ResourceSetsToReleaseList          SEQUENCE (SIZE
(1. .maxNrofZP-CSI-RS-ResourceSets) ) OF ZP-CSI-RS-ResourceSetId
OPTIONAL,     -- Need N
   p-ZP-CSI-RS-ResourceSet                         SetupRelease { ZP-
CSI-RS-ResourceSet }
OPTIONAL,     -- Need M
   . . . ,
```

-continued

```
  [ [
maxMIMO-Layers-r16                                    SetupRelease {
MaxMIMO-LayersDL-r16 }                                        OPTIONAL,
-- Need M
  minimumSchedulingOffsetK0-r16                       SetupRelease {
MinSchedulingOffsetK0-Values-r16 }                            OPTIONAL,
-- Need M
  -- Start of the parameters for DCI format 1_2 introduced in
V16.1.0
  antennaPortsFieldPresenceDCI-1-2-r16                     ENUMERATED
{enabled}                                             OPTIONAL, --
Need S
  aperiodicZP-CSI-RS-ResourceSetsToAddModListDCI-1-2-r16
SEQUENCE (SIZE (1. .maxNrofZP-CSI-RS-ResourceSets) ) OF ZP-CSI-RS-
ResourceSet
OPTIONAL,     -- Need N
  aperiodicZP-CSI-RS-ResourceSetsToReleaseListDCI-1-2-r16
SEQUENCE (SIZE (1. .maxNrofZP-CSI-RS-ResourceSets) ) OF ZP-CSI-RS-
ResourceSetId
OPTIONAL,     -- Need N
  dmrs-DownlinkForPDSCH-MappingTypeA-DCI-1-2-r16              SetupRelease
{ DMRS-DownlinkConfig }                               OPTIONAL,     --
Need M
  dmrs-DownlinkForPDSCH-MappingTypeB-DCI-1-2-r16              SetupRelease
{ DMRS-DownlinkConfig }                               OPTIONAL,     --
Need M
  dmrs-SequenceInitializationDCI-1-2-r16                      ENUMERATED
{enabled}                                                OPTIONAL,     --
Need S
  harq-ProcessNumberSizeDCI-1-2-r16                           INTEGER
(0. .4)                                                     OPTIONAL,    -
- Need R
  mcs-TableDCI-1-2-r16                                        ENUMERATED
{qam256, qam64LowSE}                                     OPTIONAL,     --
Need S
  numberOfBitsForRV-DCI-1-2-r16                               INTEGER
(0. .2)                                                     OPTIONAL,    -
- Need R
  pdsch-TimeDomainAllocationListDCI-1-2-r16                   SetupRelease
{ PDSCH-TimeDomainResourceAllocationList-r16 }
OPTIONAL,     -- Need M
  prb-BundlingTypeDCI-1-2-r16                         CHOICE {
    staticBundling-r16                                   SEQUENCE {
      bundleSize-r16                                          ENUMERATED {
n4, wideband }                                        OPTIONAL     --
Need S
    },
    dynamicBundling-r16                                  SEQUENCE {
      bundleSizeSet1-r16                                      ENUMERATED {
n4, wideband, n2-wideband, n4-wideband }              OPTIONAL,     --
Need S
      bundleSizeSet2-r16                                      ENUMERATED {
n4, wideband }                                        OPTIONAL     --
Need S
    }
  }
OPTIONAL,     -- Need R
  priorityIndicatorDCI-1-2-r16                           ENUMERATED
{enabled}                                                   OPTIONAL,
-- Need S
  rateMatchPatternGroup1DCI-1-2-r16
RateMatchPatternGroup
OPTIONAL,     -- Need R
  rateMatchPatternGroup2DCI-1-2-r16
RateMatchPatternGroup
OPTIONAL,     -- Need R
  resourceAllocationType1GranularityDCI-1-2-r16             ENUMERATED
{n2, n4, n8, n16}                                        OPTIONAL,     --
Need S
  vrb-ToPRB-InterleaverDCI-1-2-r16                       ENUMERATED {n2,
n4}                                                      OPTIONAL,     --
Need S
  referenceOfSLIVDCI-1-2-r16                             ENUMERATED
{enabled}                                                   OPTIONAL,
-- Need S
  resourceAllocationDCI-1-2-r16                          ENUMERATED {
resourceAllocationType0, resourceAllocationType1, dynamicSwitch}
OPTIONAL,     -- Need M
  -- End of the parameters for DCI format 1_2 introduced in
```

-continued

```
V16.1.0
  priorityIndicatorDCI-1-1-r16                      ENUMERATED {enabled}
OPTIONAL,    -- Need S
  dataScramblingIdentityPDSCH2-r16                  INTEGER (0. .1023)
OPTIONAL,    -- Need R
  pdsch-TimeDomainAllocationList-r16                SetupRelease {
PDSCH-TimeDomainResourceAllocationList-r16 }            OPTIONAL,    -
- Need M
  repetitionSchemeConfig-r16                        SetupRelease {
RepetitionSchemeConfig-r16}                             OPTIONAL    -
- Need M
  ] ],
  [ [
  repetitionSchemeConfig-v1630                      SetupRelease {
RepetitionSchemeConfig-v1630}                           OPTIONAL    -
- Need M
  ] ]
}
RateMatchPatternGroup : :=                      SEQUENCE (SIZE
(1. .maxNrofRateMatchPatternsPerGroup) ) OF CHOICE {
  cellLevel                                       RateMatchPatternId,
  bwpLevel                                        RateMatchPatternId
}
MinSchedulingOffsetK0-Values-r16 : :=           SEQUENCE (SIZE
(1. .maxNrOfMinSchedulingOffsetValues-r16) ) OF INTEGER (0. .maxK0-
SchedulingOffset-r16)
MaxMIMO-LayersDL-r16 : :=                       INTEGER (1. .8)
-- TAG-PDSCH-CONFIG-STOP
-- ASN1STOP
```

Each BWP can be configured independently, i.e., provided with different sets of RRC parameters. There currently exist certain challenges. Since the TCI states are configured in each cell, the resulting RRC overhead can be large.

Systems and methods for TCI state signalling for carrier aggregation are provided. In some embodiments, a method performed by a wireless device for determining TCI states includes receiving a TCI state list in a PPDSCH configuration from a reference BWP/cell; and receiving, in a BWP/cell other than the reference BWP/cell, a PDSCH configuration comprising a pointer to the reference BWP/cell. In some embodiments, RRC overhead from TCI state configuration is reduced.

Figure 2:
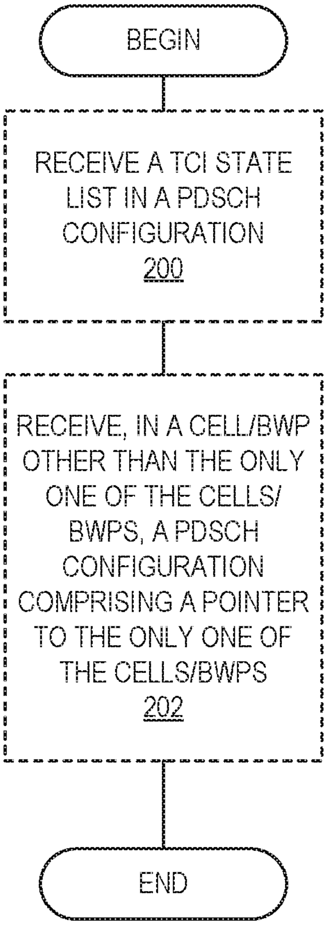
FIG. 2 illustrates a method performed by a wireless device for determining TCI states.

FIG. 2 illustrates a method performed by a wireless device for determining TCI states. The method comprises receiving a TCI state list (e.g., a TCI state pool) in a PDSCH configuration (step 200). The method also optionally includes receiving, in a cell/BWP other than the only one of the cells/BWPs, a PDSCH configuration comprising a pointer to the only one of the cells/BWPs (step 202). In some embodiments, RRC overhead from TCI state configuration is reduced.

Figure 3:
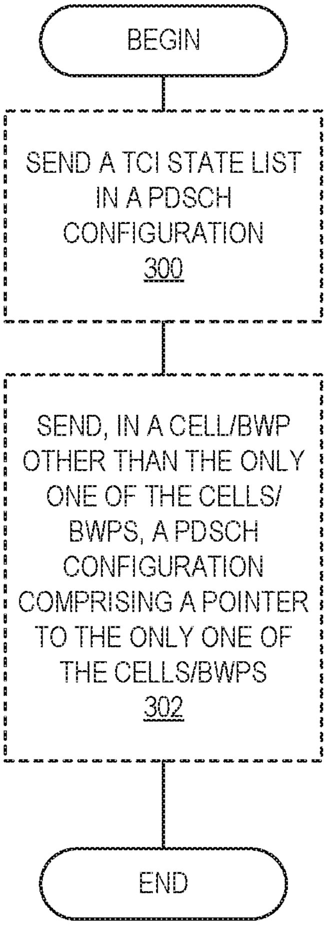
FIG. 3 illustrates a method performed by a base station for indicating TCI states, according to some embodiments of the present disclosure.

FIG. 3 illustrates a method performed by a base station for indicating TCI states, according to some embodiments of the present disclosure. The method comprises sending a TCI state list in a PDSCH configuration (step 300). The method also optionally includes sending, in a cell/BWP other than the only one of the cells/BWPs, a PDSCH configuration comprising a pointer to the only one of the cells/BWPs (step 302). In some embodiments, RRC overhead from TCI state configuration is reduced.

In a preferred embodiment, the TCI state list is only included in some cells/BWP (the reference cells), whereas in other cells/BWP, an explicit reference to the TCI state list in one of the reference cells is included. In some embodiments, the PDSCH configuration includes two new fields that provide a pointer to a reference cell and/or a reference BWP where the UE can find the TCI states. In some embodiments, when using these two fields, no TCI states are added using the field tci-StatesToAddModList.

```
-- ASN1START
-- TAG-PDSCH-CONFIG-START
PDSCH-Config : :=                               SEQUENCE {
  dataScramblingIdentityPDSCH                     INTEGER
(0. .1023)
OPTIONAL,    -- Need S
  dmrs-DownlinkForPDSCH-MappingTypeA            SetupRelease { DMRS
DownlinkConfig }                                    OPTIONAL,    --
Need M
  dmrs-DownlinkForPDSCH-MappingTypeB            SetupRelease { DMRS
DownlinkConfig }                                    OPTIONAL,    --
Need M
  tci-StatesToAddModList                        SEQUENCE
(SIZE (1. .maxNrofTCI-States) ) OF TCI-State
OPTIONAL,    -- Need N
  tci-StatesToReleaseList                       SEQUENCE
(SIZE (1. .maxNrofTCI-States) ) OF TCI-StateId
OPTIONAL,    -- Need N
  vrb-ToPRB-Interleaver                         ENUMERATED {n2, n4}
OPTIONAL,    -- Need S
  resourceAllocation                            ENUMERATED {
```

-continued

```
resourceAllocationType0, resourceAllocationType1, dynamicSwitch},
   pdsch-TimeDomainAllocationList                    SetupRelease { PDSCH-
TimeDomainResourceAllocationList }                      OPTIONAL,    --
Need M
   pdsch-AggregationFactor                           ENUMERATED { n2, n4,
n8 }                                                    OPTIONAL,    --
Need S
   rateMatchPatternToAddModList                      SEQUENCE (SIZE
(1. .maxNrofRateMatchPatterns) ) OF RateMatchPattern            OPTIONAL,
-- Need N
   rateMatchPatternToReleaseList                     SEQUENCE (SIZE
(1. .maxNrofRateMatchPatterns) ) OF RateMatchPatternId          OPTIONAL,
-- Need N
   rateMatchPatternGroup1                            RateMatchPatternGroup
OPTIONAL,    -- Need R
   rateMatchPatternGroup2                            RateMatchPatternGroup
OPTIONAL,    -- Need R
   rbg-Size                                          ENUMERATED {config1,
config2},
   mcs-Table                                         ENUMERATED {qam256,
qam6 4LowSE}                                               OPTIONAL,    --
Need S
   maxNrofCodeWordsScheduledByDCI                    ENUMERATED {n1, n2}
OPTIONAL,    -- Need R
   prb-BundlingType                                  CHOICE {
      staticBundling                                      SEQUENCE {
         bundleSize                                          ENUMERATED {
n4, wideband }                                          OPTIONAL    --
Need S
      },
      dynamicBundling                                SEQUENCE {
         bundleSizeSet1                                   ENUMERATED { n4,
wideband, n2-wideband, n4-wideband }                    OPTIONAL,    --
Need S
         bundleSizeSet2                                 ENUMERATED { n4,
wideband }                                              OPTIONAL    --
Need S
      }
   },
   zp-CSI-RS-ResourceToAddModList                             SEQUENCE
(SIZE (1. .maxNrofZP-CSI-RS-Resources) ) OF ZP-CSI-RS-Resource
OPTIONAL,    -- Need N
   zp-CSI-RS-ResourceToReleaseList                            SEQUENCE
(SIZE (1. .maxNrofZP-CSI-RS-Resources) ) OF ZP-CSI-RS-ResourceId
OPTIONAL,    -- Need N
   aperiodic-ZP-CSI-RS-ResourceSetsToAddModList               SEQUENCE
(SIZE (1. .maxNrofZP-CSI-RS-ResourceSets) ) OF ZP-CSI-RS-
ResourceSet
OPTIONAL,    -- Need N
   aperiodic-ZP-CSI-RS-ResourceSetsToReleaseList           SEQUENCE (SIZE
(1. .maxNrofZP-CSI-RS-ResourceSets) ) OF ZP-CSI-RS-ResourceSetId
OPTIONAL,    -- Need N
   sp-ZP-CSI-RS-ResourceSetsToAddModList             SEQUENCE (SIZE
(1. .maxNrofZP-CSI-RS-ResourceSets) ) OF ZP-CSI-RS-ResourceSet
OPTIONAL,    -- Need N
   sp-ZP-CSI-RS-ResourceSetsToReleaseList            SEQUENCE (SIZE
(1. .maxNrofZP-CSI-RS-ResourceSets) ) OF ZP-CSI-RS-ResourceSetId
OPTIONAL,    -- Need N
   p-ZP-CSI-RS-ResourceSet                           SetupRelease { ZP-
CSI-RS-ResourceSet }
OPTIONAL,    -- Need M
   . . . ,
   [ [
   maxMIMO-Layers-r16                                SetupRelease {
MaxMIMO-LayersDL-r16 }                                     OPTIONAL,
-- Need M
   minimumSchedulingOffsetK0-r16                     SetupRelease {
MinSchedulingOffsetKO-Values-r16 }                         OPTIONAL,
-- Need M
   -- Start of the parameters for DCI format 1_2 introduced in
V16.1.0
   antennaPortsFieldPresenceDCI-1-2-r16                       ENUMERATED
{enabled}                                                OPTIONAL,    --
Need S
   aperiodicZP-CSI-RS-ResourceSetsToAddModListDCI-1-2-r16
SEQUENCE (SIZE (1. .maxNrofZP-CSI-RS-ResourceSets) ) OF ZP-CSI-RS-
ResourceSet
OPTIONAL,    -- Need N
   aperiodicZP-CSI-RS-ResourceSetsToReleaseListDCI-1-2-r16
```

-continued

```
SEQUENCE (SIZE (1. .maxNrofZP-CSI-RS-ResourceSets) ) OF ZP-CSI-RS-
ResourceSetId
OPTIONAL,    -- Need N
   dmrs-DownlinkForPDSCH-MappingTypeA-DCI-1-2-r16            SetupRelease
{ DMRS-DownlinkConfig }                               OPTIONAL,    --
Need M
   dmrs-DownlinkForPDSCH-MappingTypeB-DCI-1-2-r16            SetupRelease
{ DMRS-DownlinkConfig }                               OPTIONAL,    --
Need M
   dmrs-SequenceInitializationDCI-1-2-r16                    ENUMERATED
{enabled}                                                OPTIONAL,    --
Need S
   harq-ProcessNumberSizeDCI-1-2-r16                         INTEGER
(0. .4)                                                    OPTIONAL,       -
- Need R
   mcs-TableDCI-1-2-r16                                      ENUMERATED
{qam256, qam64LowSE}                                     OPTIONAL,    --
Need S
   numberOfBitsForRV-DCI-1-2-r16                             INTEGER
(0. .2)                                                    OPTIONAL,       -
- Need R
   pdsch-TimeDomainAllocationListDCI-1-2-r16                 SetupRelease
{ PDSCH-TimeDomainResourceAllocationList-r16 }
OPTIONAL,    -- Need M
   prb-BundlingTypeDCI-1-2-r16                          CHOICE {
      staticBundling-r16                                  SEQUENCE {
         bundleSize-r16                                      ENUMERATED {
n4, wideband }                                        OPTIONAL    --
Need S
      },
      dynamicBundling-r16                                 SEQUENCE {
         bundleSizeSet1-r16                                  ENUMERATED {
n4, wideband, n2-wideband, n4-wideband }              OPTIONAL,    --
Need S
         bundleSizeSet2-r16                                  ENUMERATED {
n4, wideband }                                        OPTIONAL    --
Need S
      }
   }
OPTIONAL,    -- Need R
   priorityIndicatorDCI-1-2-r16                          ENUMERATED
{enabled}                                                   OPTIONAL,
-- Need S
   rateMatchPatternGroup1DCI-1-2-r16
RateMatchPatternGroup
OPTIONAL,    -- Need R
   rateMatchPatternGroup2DCI-1-2-r16
RateMatchPatternGroup
OPTIONAL,    -- Need R
   resourceAllocationType1GranularityDCI-1-2-r16               ENUMERATED
{n2, n4, n8, n16}                                          OPTIONAL,    --
Need S
   vrb-ToPRB-InterleaverDCI-1-2-r16                       ENUMERATED {n2,
n4}                                                      OPTIONAL,    --
Need S
   referenceOfSLIVDCI-1-2-r16                             ENUMERATED
{enabled}                                                   OPTIONAL,
-- Need S
   resourceAllocationDCI-1-2-r16                          ENUMERATED {
resourceAllocationType0, resourceAllocationType1, dynamicSwitch }
OPTIONAL,    -- Need M
   -- End of the parameters for DCI format 1_2 introduced in
V16.1.0
   priorityIndicatorDCI-1-1-r16                          ENUMERATED {enabled}
OPTIONAL,    -- Need S
   dataScramblingIdentityPDSCH2-r16                      INTEGER (0. .1023)
OPTIONAL,    -- Need R
   pdsch-TimeDomainAllocationList-r16                    SetupRelease {
PDSCH-TimeDomainResourceAllocationList-r16 }                OPTIONAL,    -
- Need M
   repetitionSchemeConfig-r16                            SetupRelease {
RepetitionSchemeConfig-r16}                                 OPTIONAL    -
- Need M
   ] ],
   [ [
   repetitionSchemeConfig-v1630                          SetupRelease {
RepetitionSchemeConfig-v1630}                               OPTIONAL    -
- Need M
   ] ]
```

-continued

```
}
RateMatchPatternGroup : :=                          SEQUENCE (SIZE
(1. .maxNrofRateMatchPatternsPerGroup) ) OF CHOICE {
  cellLevel                                          RateMatchPatternId,
  bwpLevel                                           RateMatchPatternId
}
MinSchedulingOffsetK0-Values-r16 : :=               SEQUENCE (SIZE
(1. .maxNrOfMinSchedulingOffsetValues-r16) ) OF INTEGER (0. .maxK0-
SchedulingOffset-r16)
MaxMIMO-LayersDL-r16 : :=                           INTEGER (1. .8)
TCIStateReferenceCell : := ServCellIndex
TCIStateReferenceBWP : := BWP-Id
-- TAG-PDSCH-CONFIG-STOP
-- ASN1STOP
```

Figure 4:
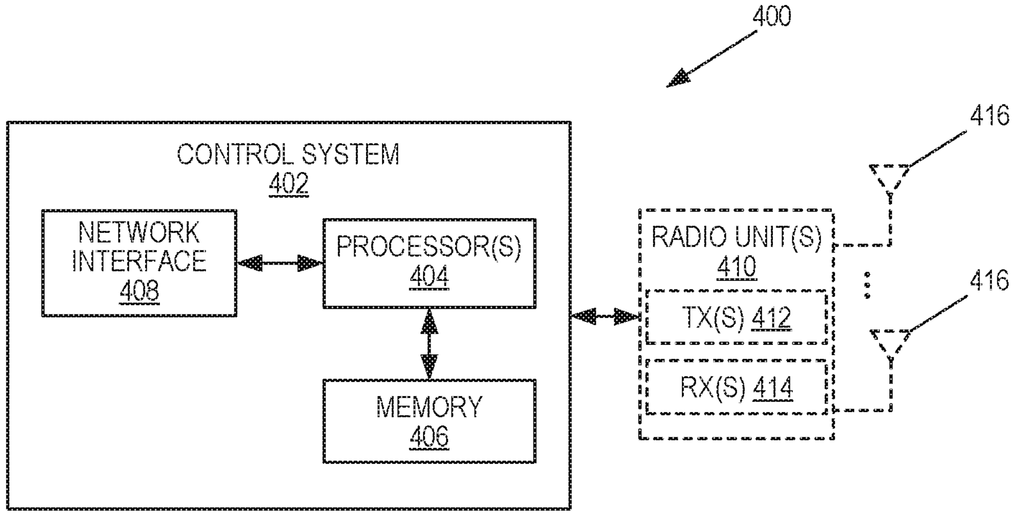
FIG. 4 is a schematic block diagram of a radio access node, according to some embodiments of the present disclosure.

FIG. 4 is a schematic block diagram of a radio access node 400 according to some embodiments of the present disclosure. Optional features are represented by dashed boxes. The radio access node 400 may be, for example, a base station 102 or 106 or a network node that implements all or part of the functionality of the base station 102 or gNB described herein. As illustrated, the radio access node 400 includes a control system 402 that includes one or more processors 404 (e.g., Central Processing Units (CPUs), Application Specific Integrated Circuits (ASICs), Field Programmable Gate Arrays (FPGAS), and/or the like), memory 406, and a network interface 408. The one or more processors 404 are also referred to herein as processing circuitry. In addition, the radio access node 400 may include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a radio access node 400 as described herein. In some embodiments, the function(s) are implemented in software that is stored, e.g., in the memory 406 and executed by the one or more processors 404.

Figure 5:
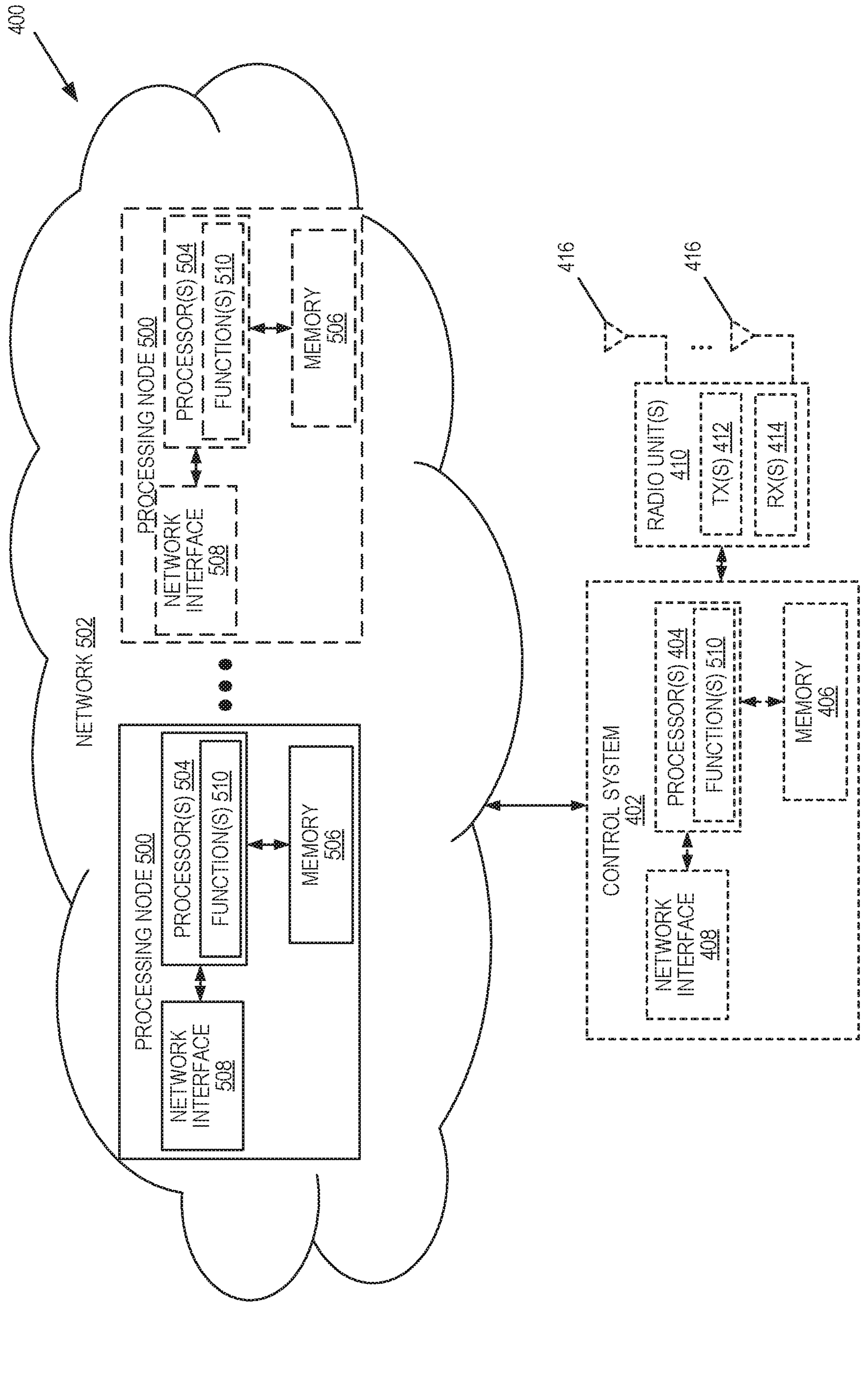
FIG. 5 is a schematic block diagram that illustrates a virtualized embodiment of the radio access node according to some embodiments of the present disclosure.

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node (s) in a network(s)). As illustrated, in this example, the radio access node 400 may include the control system 402 and/or the one or more radio units 410, as described above. The control system 402 may be connected to the radio unit(s) 410 via, for example, an optical cable or the like. The radio access node 400 includes one or more processing nodes 500 coupled to or included as part of a network(s) 502. If present, the control system 402 or the radio unit(s) are connected to the processing node(s) 500 via the network 502. Each processing node 500 includes one or more processors 504 (e.g., CPUs, ASICS, FPGAS, and/or the like), memory 506, and a network interface 508.

In this example, functions 510 of the radio access node 400 described herein are implemented at the one or more processing nodes 500 or distributed across the one or more processing nodes 500 and the control system 402 and/or the radio unit(s) 410 in any desired manner. In some particular embodiments, some or all of the functions 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
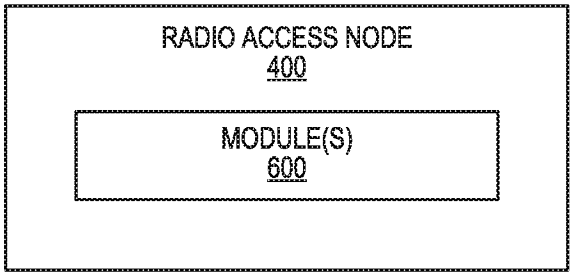
FIG. 6 is a schematic block diagram of the radio access node according to some other embodiments of the present disclosure.

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
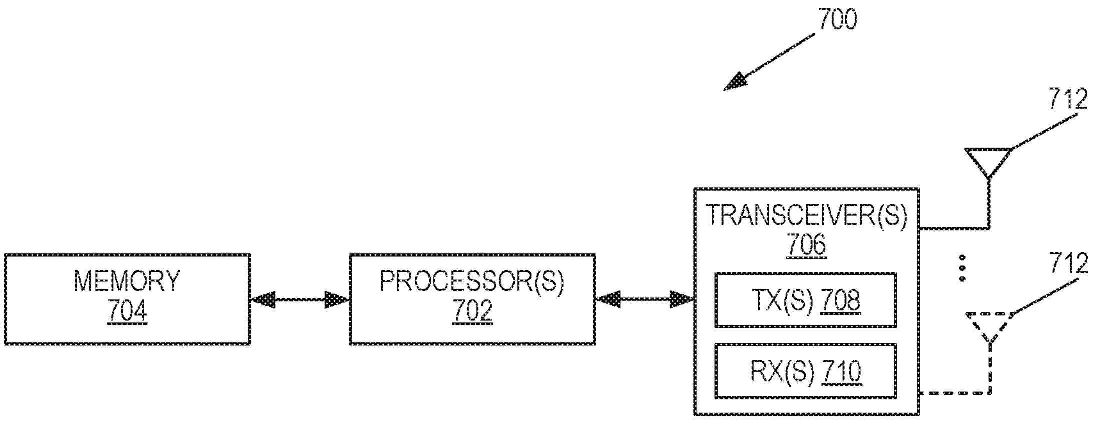
FIG. 7 is a schematic block diagram of a wireless communication device according to some other embodiments of the present disclosure.

FIG. 7 is a schematic block diagram of a wireless communication device 700 according to some embodiments of the present disclosure. As illustrated, the wireless communication device 700 includes one or more processors 702 (e.g., CPUs, ASICS, FPGAS, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the wireless communication device 700 described above may be fully or partially implemented in software that is, e.g., stored in the memory 704 and executed by the processor(s) 702. Note that the wireless communication device 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the wireless communication device 700 and/or allowing output of information from the wireless communication device 700), a power supply (e.g., a battery and associated power circuitry), etc.

In some embodiments, a computer program including instructions which, when executed by at least one processor, causes the at least one processor to carry out the functionality of the wireless communication device 700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
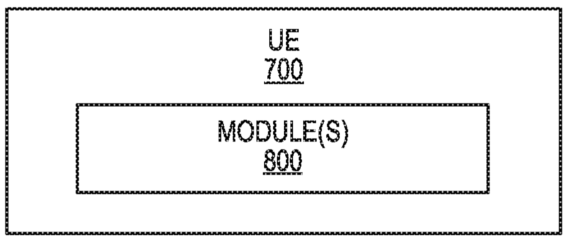
FIG. 8 is a schematic block diagram of the wireless communication device according to some other embodiments of the present disclosure.

FIG. 8 is a schematic block diagram of the wireless communication device 700 according to some other embodiments of the present disclosure. The wireless communication device 700 includes one or more modules 800, each of which is implemented in software. The module(s) 800 provide the functionality of the wireless communication device 700 described herein.

Figure 9:
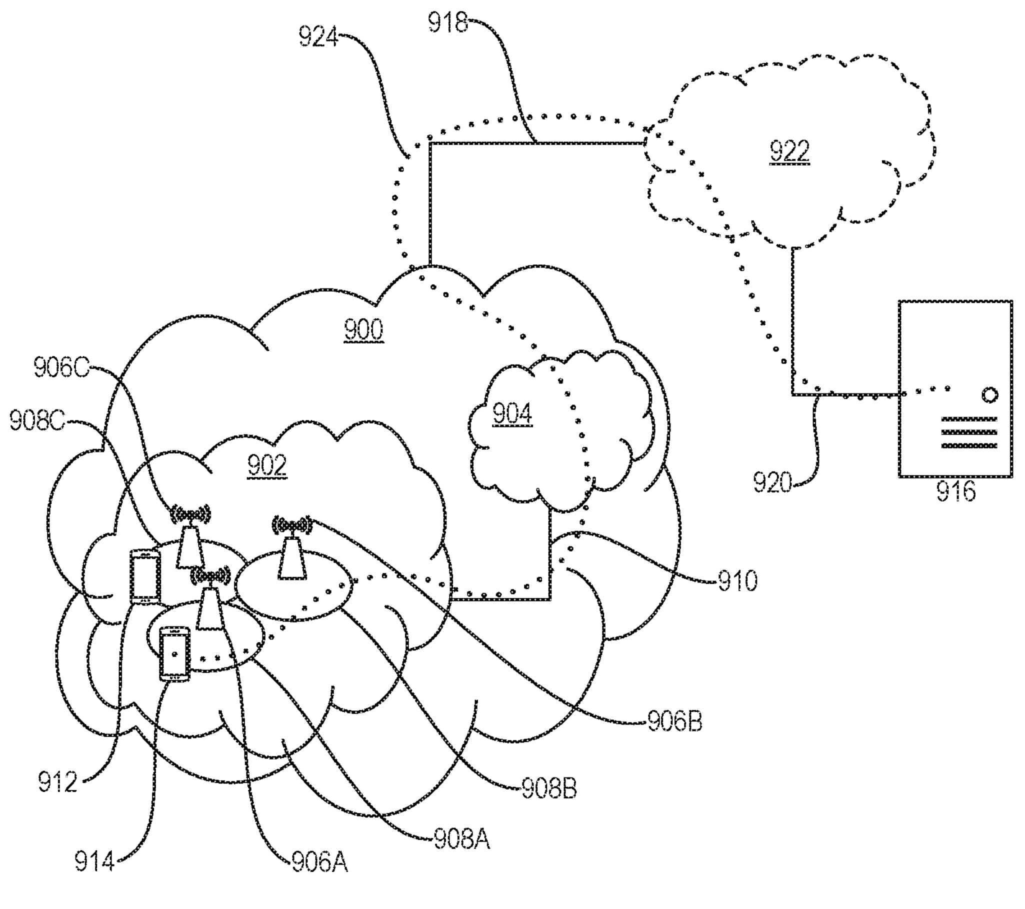
FIG. 9 illustrates a communication system includes a telecommunication network, such as a 3GPP-type cellular network, which comprises an access network, such as a RAN, and a core network, according to some embodiments of the present disclosure.

With reference to FIG. 9, in accordance with an embodiment, a communication system includes a telecommunication network 900, such as a 3GPP-type cellular network, which comprises an access network 902, such as a RAN, and a core network 904. The access network 902 comprises a plurality of base stations 906A, 906B, 906C, such as Node Bs, eNBs, gNBs, or other types of wireless Access Points (APs), each defining a corresponding coverage area 908A, 908B, 908C. Each base station 906A, 906B, 906C is connectable to the core network 904 over a wired or wireless connection 910. A first UE 912 located in coverage area 908C is configured to wirelessly connect to, or be paged by, the corresponding base station 906C. A second UE 914 in coverage area 908A is wirelessly connectable to the corresponding base station 906A. While a plurality of UEs 912, 914 are illustrated in this example, the disclosed embodiments are equally applicable to a situation where a sole UE is in the coverage area or where a sole UE is connecting to the corresponding base station 906.

The telecommunication network 900 is itself connected to a host computer 916, which may be embodied in the hardware and/or software of a standalone server, a cloud-implemented server, a distributed server, or as processing resources in a server farm. The host computer 916 may be under the ownership or control of a service provider or may be operated by the service provider or on behalf of the service provider. Connections 918 and 920 between the telecommunication network 900 and the host computer 916 may extend directly from the core network 904 to the host computer 916 or may go via an optional intermediate network 922. The intermediate network 922 may be one of, or a combination of more than one of, a public, private, or hosted network; the intermediate network 922, if any, may be a backbone network or the Internet; in particular, the intermediate network 922 may comprise two or more subnetworks (not shown).

The communication system of FIG. 9 as a whole enables connectivity between the connected UEs 912, 914 and the host computer 916. The connectivity may be described as an Over-the-Top (OTT) connection 924. The host computer 916 and the connected UEs 912, 914 are configured to communicate data and/or signaling via the OTT connection 924, using the access network 902, the core network 904, any intermediate network 922, and possible further infrastructure (not shown) as intermediaries. The OTT connection 924 may be transparent in the sense that the participating communication devices through which the OTT connection 924 passes are unaware of routing of uplink and downlink communications. For example, the base station 906 may not or need not be informed about the past routing of an incoming downlink communication with data originating from the host computer 916 to be forwarded (e.g., handed over) to a connected UE 912. Similarly, the base station 906 need not be aware of the future routing of an outgoing uplink communication originating from the UE 912 towards the host computer 916.

Example implementations, in accordance with an embodiment, of the UE, base station, and host computer discussed in the preceding paragraphs will now be described with reference to FIG. 10. In a communication system 1000, a host computer 1002 comprises hardware 1004 including a communication interface 1006 configured to set up and maintain a wired or wireless connection with an interface of a different communication device of the communication system 1000. The host computer 1002 further comprises processing circuitry 1008, which may have storage and/or processing capabilities. In particular, the processing circuitry 1008 may comprise one or more programmable processors, ASICs, FPGAS, or combinations of these (not shown) adapted to execute instructions. The host computer 1002 further comprises software 1010, which is stored in or accessible by the host computer 1002 and executable by the processing circuitry 1008. The software 1010 includes a host application 1012. The host application 1012 may be operable to provide a service to a remote user, such as a UE 1014 connecting via an OTT connection 1016 terminating at the UE 1014 and the host computer 1002. In providing the service to the remote user, the host application 1012 may provide user data which is transmitted using the OTT connection 1016.

The communication system 1000 further includes a base station 1018 provided in a telecommunication system and comprising hardware 1020 enabling it to communicate with the host computer 1002 and with the UE 1014. The hardware 1020 may include a communication interface 1022 for setting up and maintaining a wired or wireless connection with an interface of a different communication device of the communication system 1000, as well as a radio interface 1024 for setting up and maintaining at least a wireless connection 1026 with the UE 1014 located in a coverage area (not shown in FIG. 10) served by the base station 1018. The communication interface 1022 may be configured to facilitate a connection 1028 to the host computer 1002. The connection 1028 may be direct or it may pass through a core network (not shown in FIG. 10) of the telecommunication system and/or through one or more intermediate networks outside the telecommunication system. In the embodiment shown, the hardware 1020 of the base station 1018 further includes processing circuitry 1030, which may comprise one or more programmable processors, ASICS, FPGAS, or combinations of these (not shown) adapted to execute instructions. The base station 1018 further has software 1032 stored internally or accessible via an external connection.

The communication system 1000 further includes the UE 1014 already referred to. The UE's 1014 hardware 1034 may include a radio interface 1036 configured to set up and maintain a wireless connection 1026 with a base station serving a coverage area in which the UE 1014 is currently located. The hardware 1034 of the UE 1014 further includes processing circuitry 1038, which may comprise one or more programmable processors, ASICs, FPGAs, or combinations of these (not shown) adapted to execute instructions. The UE 1014 further comprises software 1040, which is stored in or accessible by the UE 1014 and executable by the processing circuitry 1038. The software 1040 includes a client application 1042. The client application 1042 may be operable to provide a service to a human or non-human user via the UE 1014, with the support of the host computer 1002. In the host computer 1002, the executing host application 1012 may communicate with the executing client application 1042 via the OTT connection 1016 terminating at the UE 1014 and the host computer 1002. In providing the service to the user, the client application 1042 may receive request data from the host application 1012 and provide user data in response to the request data. The OTT connection 1016 may transfer both the request data and the user data. The client application 1042 may interact with the user to generate the user data that it provides.

Figure 10:
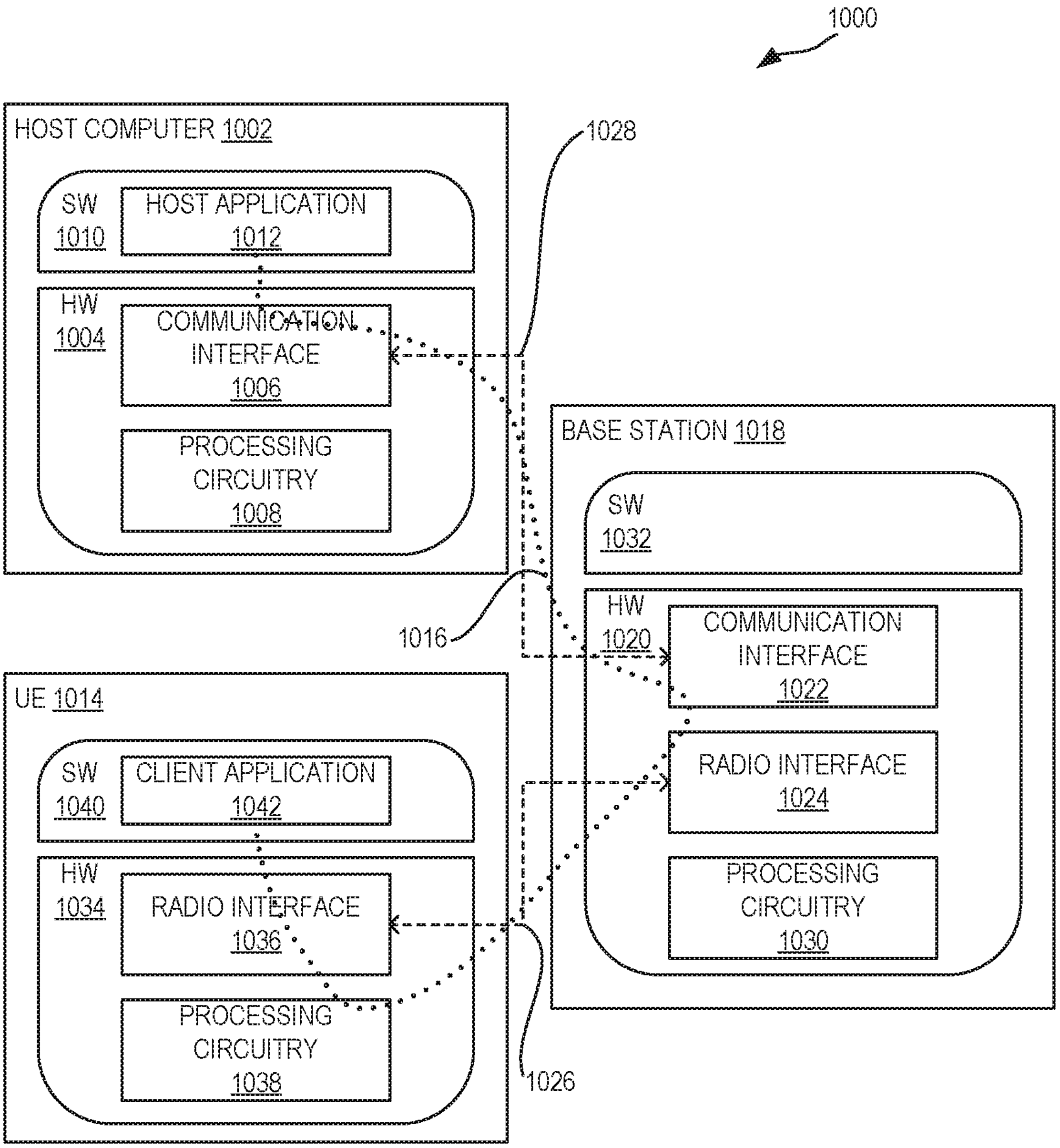
FIG. 10 illustrates a communication system, a host computer comprises hardware including a communication interface configured to set up and maintain a wired or wireless connection with an interface of a different communication device of the communication system, according to some embodiments of the present disclosure.

It is noted that the host computer 1002, the base station 1018, and the UE 1014 illustrated in FIG. 10 may be similar or identical to the host computer 916, one of the base stations 906A, 906B, 906C, and one of the UEs 912, 914 of FIG. 9, respectively. This is to say, the inner workings of these entities may be as shown in FIG. 10 and independently, the surrounding network topology may be that of FIG. 9.

In FIG. 10, the OTT connection 1016 has been drawn abstractly to illustrate the communication between the host computer 1002 and the UE 1014 via the base station 1018 without explicit reference to any intermediary devices and the precise routing of messages via these devices. The network infrastructure may determine the routing, which may be configured to hide from the UE 1014 or from the service provider operating the host computer 1002, or both. While the OTT connection 1016 is active, the network infrastructure may further take decisions by which it dynamically changes the routing (e.g., on the basis of load balancing consideration or reconfiguration of the network).

The wireless connection 1026 between the UE 1014 and the base station 1018 is in accordance with the teachings of the embodiments described throughout this disclosure. One or more of the various embodiments improve the performance of OTT services provided to the UE 1014 using the OTT connection 1016, in which the wireless connection 1026 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1016 between the host computer 1002 and the UE 1014, in response to variations in the measurement results. The measurement procedure and/or the network functionality for reconfiguring the OTT connection 1016 may be implemented in the software 1010 and the hardware 1004 of the host computer 1002 or in the software 1040 and the hardware 1034 of the UE 1014, or both. In some embodiments, sensors (not shown) may be deployed in or in association with communication devices through which the OTT connection 1016 passes; the sensors may participate in the measurement procedure by supplying values of the monitored quantities exemplified above, or supplying values of other physical quantities from which the software 1010, 1040 may compute or estimate the monitored quantities. The reconfiguring of the OTT connection 1016 may include message format, retransmission settings, preferred routing, etc.; the reconfiguring need not affect the base station 1018, and it may be unknown or imperceptible to the base station 1018. Such procedures and functionalities may be known and practiced in the art. In certain embodiments, measurements may involve proprietary UE signaling facilitating the host computer 1002's measurements of throughput, propagation times, latency, and the like. The measurements may be implemented in that the software 1010 and 1040 causes messages to be transmitted, in particular empty or 'dummy' messages, using the OTT connection 1016 while it monitors propagation times, errors, etc.

Figure 11:
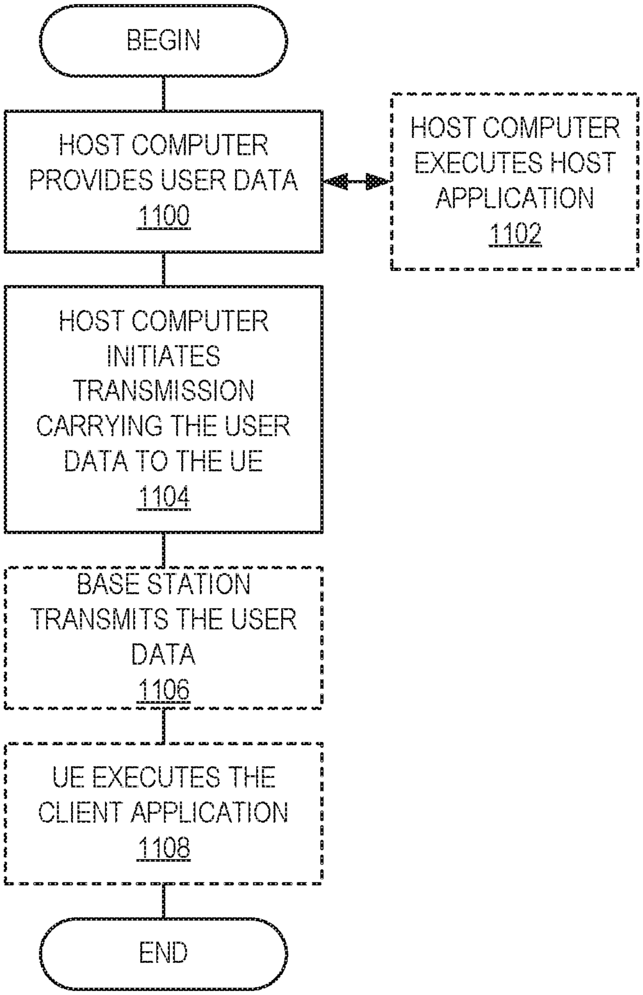
FIGS. 11 through 14 is a flowchart illustrating a method implemented in a communication system, in accordance with one embodiment.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1100, the host computer provides user data. In sub-step 1102 (which may be optional) of step 1100, the host computer provides the user data by executing a host application. In step 1104, the host computer initiates a transmission carrying the user data to the UE. In step 1106 (which may be optional), the base station transmits to the UE the user data which was carried in the transmission that the host computer initiated, in accordance with the teachings of the embodiments described throughout this disclosure. In step 1108 (which may also be optional), the UE executes a client application associated with the host application executed by the host computer.

Figure 12:
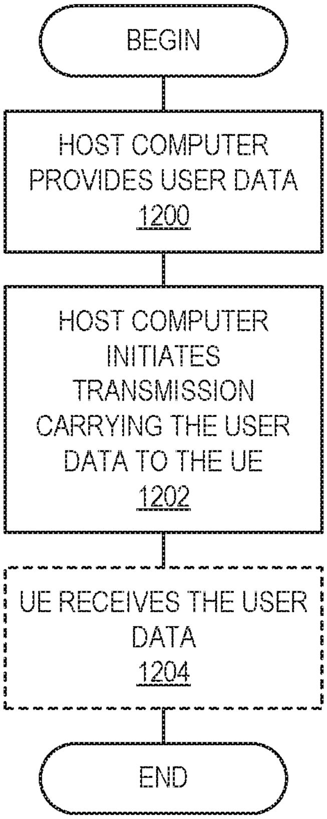

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1200 of the method, the host computer provides user data. In an optional sub-step (not shown) the host computer provides the user data by executing a host application. In step 1202, the host computer initiates a transmission carrying the user data to the UE. The transmission may pass via the base station, in accordance with the teachings of the embodiments described throughout this disclosure. In step 1204 (which may be optional), the UE receives the user data carried in the transmission.

Figure 13:
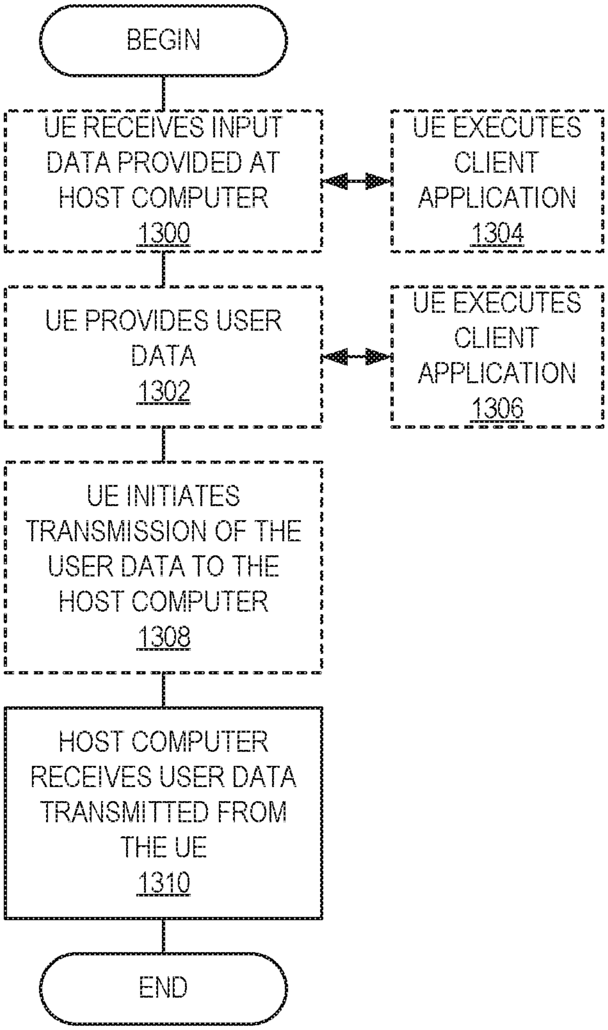

FIG. 13 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 13 will be included in this section. In step 1300 (which may be optional), the UE receives input data provided by the host computer. Additionally or alternatively, in step 1302, the UE provides user data. In sub-step 1304 (which may be optional) of step 1300, the UE provides the user data by executing a client application. In sub-step 1306 (which may be optional) of step 1302, the UE executes a client application which provides the user data in reaction to the received input data provided by the host computer. In providing the user data, the executed client application may further consider user input received from the user. Regardless of the specific manner in which the user data was provided, the UE initiates, in sub-step 1308 (which may be optional), transmission of the user data to the host computer. In step 1310 of the method, the host computer receives the user data transmitted from the UE, in accordance with the teachings of the embodiments described throughout this disclosure.

Figure 14:
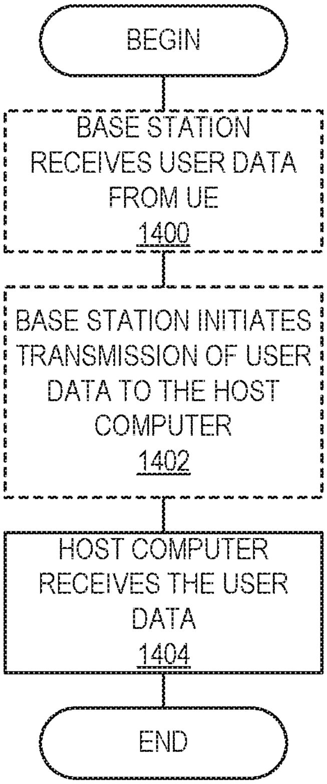

FIG. 14 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 14 will be included in this section. In step 1400 (which may be optional), in accordance with the teachings of the embodiments described throughout this disclosure, the base station receives user data from the UE. In step 1402 (which may be optional), the base station initiates transmission of the received user data to the host computer. In step 1404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for determining Transmission Configuration Indicator, TCI, states, the method comprising one or more of: receiving (200) a TCI state list in a Physical Downlink Shared Channel, PDSCH, configuration.

Embodiment 2: The method of embodiment 1 wherein the TCI state list is received in the PDSCH configuration in only one of the cells/Bandwidth Parts, BWPs.

Embodiment 3: The method of embodiment 1 wherein the TCI state list is received in the PDSCH configuration in only a subset of the cells/Bandwidth Parts, BWPs.

Embodiment 4: The method of any of embodiments 2 to 3 further comprising: receiving (202), in a cell/BWP other than the only one of the cells/BWPs, a PDSCH configuration comprising a pointer to the only one of the cells/BWPs.

Embodiment 5: The method of any of embodiments 2 to 4 wherein the only one of the cells/BWPs comprises a reference cell/BWP.

Embodiment 6: The method of any of embodiments 2 to 4 wherein the only a subset of the cells/BWPs comprises a set of reference cells/BWPs.

Embodiment 7: The method of any of embodiments 4 to 6 wherein the PDSCH configuration comprises two new fields that provide the pointer to a reference cell and/or a reference BWP where the wireless device can find the TCI states.

Embodiment 8: The method of embodiment 7 wherein when using the two fields, no TCI states are added using the field tci-StatesToAddModList.

Embodiment 9: The method of any of the previous embodiments, further comprising: providing user data; and forwarding the user data to a host computer via the transmission to the base station.

Group B Embodiments

Embodiment 10: A method performed by a base station for indicating Transmission Configuration Indicator, TCI, states, the method comprising one or more of: sending (300) a TCI state list in a Physical Downlink Shared Channel, PDSCH, configuration.

Embodiment 11: The method of embodiment 10 wherein the TCI state list is sent in the PDSCH configuration in only one of the cells/Bandwidth Parts, BWPS.

Embodiment 12: The method of embodiment 10 wherein the TCI state list is sent in the PDSCH configuration in only a subset of the cells/Bandwidth Parts, BWPs.

Embodiment 13: The method of any of embodiments 11 to 12 further comprising: sending (302), in a cell/BWP other than the only one of the cells/BWPs, a PDSCH configuration comprising a pointer to the only one of the cells/BWPs.

Embodiment 14: The method of any of embodiments 11 to 13 wherein the only one of the cells/BWPs comprises a reference cell/BWP.

Embodiment 15: The method of any of embodiments 11 to 13 wherein the only a subset of the cells/BWPs comprises a set of reference cells/BWPs.

Embodiment 16: The method of any of embodiments 13 to 15 wherein the PDSCH configuration comprises two new fields that provide the pointer to a reference cell and/or a reference BWP where the wireless device can find the TCI states.

Embodiment 17: The method of embodiment 7 wherein when using the two fields, no TCI states are added using the field tci-StatesToAddModList.

Embodiment 18: The method of any of the previous embodiments, further comprising: obtaining user data; and forwarding the user data to a host computer or a wireless device.

Group C Embodiments

Embodiment 19: A wireless device for determining Transmission Configuration Indicator, TCI, states, the wireless device comprising: processing circuitry configured to perform any of the steps of any of the Group A embodiments; and power supply circuitry configured to supply power to the wireless device.

Embodiment 20: A base station for indicating Transmission Configuration Indicator, TCI, states, the base station comprising: processing circuitry configured to perform any of the steps of any of the Group B embodiments; and power supply circuitry configured to supply power to the base station.

Embodiment 21: A User Equipment, UE, for determining Transmission Configuration Indicator, TCI, states, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 22: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 23: The communication system of the previous embodiment further including the base station.

Embodiment 24: The communication system of the previous 2 embodiments, further including the UE, wherein the UE is configured to communicate with the base station.

Embodiment 25: The communication system of the previous 3 embodiments, wherein: the processing circuitry of the host computer is configured to execute a host application, thereby providing the user data; and the UE comprises processing circuitry configured to execute a client application associated with the host application.

Embodiment 26: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 27: The method of the previous embodiment, further comprising, at the base station, transmitting the user data.

Embodiment 28: The method of the previous 2 embodiments, wherein the user data is provided at the host computer by executing a host application, the method further comprising, at the UE, executing a client application associated with the host application.

Embodiment 29: A User Equipment, UE, configured to communicate with a base station, the UE comprising a radio interface and processing circuitry configured to perform the method of the previous 3 embodiments.

Embodiment 30: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 31: The communication system of the previous embodiment, wherein the cellular network further includes a base station configured to communicate with the UE.

Embodiment 32: The communication system of the previous 2 embodiments, wherein: the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 34: The method of the previous embodiment, further comprising at the UE, receiving the user data from the base station.

Embodiment 35: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 36: The communication system of the previous embodiment, further including the UE.

Embodiment 37: The communication system of the previous 2 embodiments, further including the base station, wherein the base station comprises a radio interface configured to communicate with the UE and a communication interface configured to forward to the host computer the user data carried by a transmission from the UE to the base station.

Embodiment 38: The communication system of the previous 3 embodiments, wherein: the processing circuitry of the host computer is configured to execute a host application; and the UE's processing circuitry is configured to execute a client application associated with the host application, thereby providing the user data.

Embodiment 39: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 40: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 41: The method of the previous embodiment, further comprising, at the UE, providing the user data to the base station.

Embodiment 42: The method of the previous 2 embodiments, further comprising: at the UE, executing a client application, thereby providing the user data to be transmitted; and at the host computer, executing a host application associated with the client application.

Embodiment 43: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 44: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 45: The communication system of the previous embodiment further including the base station.

Embodiment 46: The communication system of the previous 2 embodiments, further including the UE, wherein the UE is configured to communicate with the base station.

Embodiment 47: The communication system of the previous 3 embodiments, wherein: the processing circuitry of the host computer is configured to execute a host application; and the UE is configured to execute a client application associated with the host application, thereby providing the user data to be received by the host computer.

Embodiment 48: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 49: The method of the previous embodiment, further comprising at the base station, receiving the user data from the UE.

Embodiment 50: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CPU Central Processing Unit
CRB Common Resource Block
CSI-RS Channel State Information Resource Signal
DCI Downlink Control Information
DMRS Demodulated Reference Signal
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HSS Home Subscriber Server
IoT Internet of Things
IP Internet Protocol
LTE Long Term Evolution
MAC Medium Access Control
MME Mobility Management Entity
MTC Machine Type Communication
NEF Network Exposure Function
NF Network Function
NG-RAN Next Generation Radio Access Network
NR New Radio
NRF Network Function Repository Function
NSSF Network Slice Selection Function
OTT Over-the-Top
PC Personal Computer
PCF Policy Control Function
PDSCH Physical Downlink Shared Channel
P-GW Packet Data Network Gateway
PRS Positioning Reference Signal
QCL Quasi Co-Located
Qos Quality of Service
RAM Random Access Memory
RAN Radio Access Network
ROM Read Only Memory
RRC Radio Resource Control
RRH Remote Radio Head
RTT Round Trip Time
SCEF Service Capability Exposure Function
SMF Session Management Function
TCI Transmission Configuration Indicator
TP Transmission Point
TRP Transmission/Reception Point
TRS Tracking Reference Signal
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for determining Transmission Configuration Indicator, TCI, states, the method comprising:

receiving a TCI state list of TCI states in a Physical Downlink Shared Channel, PDSCH, configuration for a reference Bandwidth Part, BWP and a reference cell; and receiving, in a BWP and in a cell other than the reference BWP and the reference cell, a PDSCH configuration comprising a pointer to the reference BWP and the reference cell, wherein the PDSCH configuration comprises two fields that provide the pointer to the reference cell and to the reference BWP where the wireless device can find the TCI states.

2. The method of claim 1 wherein the TCI state list is received in the PDSCH configuration in only one of the cells and the BWPs.

3. The method of claim 1 wherein the TCI state list is received in the PDSCH configuration in only a subset of the cells and the BWPs.

4. The method of claim 1 wherein the TCI state list comprises a TCI state pool.

5. The method of claim 1 wherein the only a subset of the cells and the BWPs comprises a set of reference cells and the BWPs.

6. The method of claim 1 wherein when using the two fields, no TCI states are added using the field tci-States-ToAddModList.

7. A method performed by a base station for indicating Transmission Configuration Indicator, TCI, states, the method comprising:

sending a TCI state list of TCI states in a Physical Downlink Shared Channel, PDSCH, configuration for a reference Bandwidth Part, BWP and a reference cell; and sending, in a BWP and in a cell other than the reference BWP and the reference cell, a PDSCH configuration comprising a pointer to the reference BWP and the reference cell, wherein the PDSCH configuration comprises two fields that provide the pointer to the reference cell and to the reference BWP where the wireless device can find the TCI states.

8. The method of claim 7 wherein the TCI state list is sent in the PDSCH configuration in only one of the cells and the BWPs.

9. The method of claim 7 wherein the TCI state list is sent in the PDSCH configuration in only a subset of the cells and the BWPs.

10. The method of claim 7 wherein the TCI state list comprises a TCI state pool.

11. The method of claim 7 wherein the only a subset of the cells and the BWPs comprises a set of reference cells and the BWPs.

12. The method of claim 7 wherein when using the two fields, no TCI states are added using the field tci-States-ToAddModList.

13. A wireless device for determining Transmission Configuration Indicator, TCI, states, comprising one or more processors configured to cause the wireless device to:

receive a TCI state list of TCI states in a Physical Downlink Shared Channel, PDSCH, configuration for a reference Bandwidth Part, BWP and a reference cell;

receive, in a BWP and in a cell other than the reference BWP and the reference cell, a PDSCH configuration comprising a pointer to the reference BWP and the reference cell, wherein the PDSCH configuration comprises two fields that provide the pointer to the reference cell and to the reference BWP where the wireless device can find the TCI states.

14. A base station for indicating Transmission Configuration Indicator, TCI, states comprising one or more processors configured to cause the base station to:

send a TCI state list of TCI states in a Physical Downlink Shared Channel, PDSCH, configuration for a reference Bandwidth Part, BWP and a reference cell; and send, in a BWP and in a cell other than the reference BWP and the reference cell, a PDSCH configuration comprising a pointer to the reference BWP and the reference cell, wherein the PDSCH configuration comprises two fields that provide the pointer to the reference cell and to the reference BWP where the wireless device can find the TCI states.

* * * * *